United States Patent

Fleming

[15] 3,659,149

[45] Apr. 25, 1972

[54] INFORMATION DISPLAY PANEL USING AMORPHOUS SEMICONDUCTOR LAYER ADJACENT OPTICAL DISPLAY MATERIAL

[72] Inventor: Gordon R. Fleming, Pontiac, Mich.

[73] Assignee: Energy Conversion Devices, Inc., Troy, Mich.

[22] Filed: Nov. 18, 1970

[21] Appl. No.: 90,659

[52] U.S. Cl. ................................315/153, 250/80, 250/211, 313/97, 313/98, 315/158, 315/167, 315/196 TV, 340/166 EL

[51] Int. Cl. .....................H01j 1/70, H01j 1/78, H05b 33/28

[58] Field of Search ................................315/153–155, 158, 315/167, 196 R, 196 TV, 260, 315; 340/166 R, 166 EL, 324 R, 324 A, 334, 335, 343; 250/80, 211–213; 313/94, 97, 98

[56] References Cited

UNITED STATES PATENTS

| | | | |
|---|---|---|---|
| 2,988,647 | 6/1961 | Duinker et al. | 315/169 TV |
| 3,225,253 | 12/1965 | Narken et al. | 315/169 R X |
| 3,465,202 | 9/1969 | Kohashi | 315/169 R |

*Primary Examiner*—John Kominski
*Assistant Examiner*—Siegfried H. Grimm
*Attorney*—Edward G. Fiorito

[57] ABSTRACT

An amorphous semiconductor layer is employed in the display panel disclosed herein. An electroluminescent layer is sandwiched between the amorphous semiconductor layer and a set of parallel spaced conductors. An AC signal is applied to the conductors so that adjacent conductors are 180° out of phase. A field is established between adjacent conductors which passes up through the electroluminescent layer across the layer of amorphous semiconductor material and back down through another portion of the electroluminescent layer. If the amorphous semiconductor material is in a low resistance state the field across the electroluminescent material is made sufficiently strong to cause it to emit light. By switching the amorphous semiconductor material at selected regions, the electroluminescent material emits light in accordance with a desired pattern of information to be displayed. Systems are disclosed for switching the amorphous material in a variety of ways, and techniques for varying the intensity and contrast of the display are also disclosed.

17 Claims, 8 Drawing Figures

Patented April 25, 1972

3,659,149

2 Sheets-Sheet 1

INVENTOR.
GORDON R. FLEMING

BY Edward G. Fiorito

ATTORNEY

INVENTOR.
GORDON R. FLEMING
BY
Edward G. Fiorito
ATTORNEY

INFORMATION DISPLAY PANEL USING AMORPHOUS SEMICONDUCTOR LAYER ADJACENT OPTICAL DISPLAY MATERIAL

This invention relates to display panels and systems for displaying information. It may be used to display information generated by a data processing system, communication link or cathode ray tube, and can receive and record information in the form of projections through transparencies. Once the information is received it can be stored without any further requirement for power or refreshing the information with a new input. Accordingly the present invention also relates to storage panels. It can also be employed as an image intensifier.

Co-pending application Ser. No. 825,289 entitled "Display Screen" by Stanford R. Ovshinsky discloses a display screen which employs an amorphous semiconductor layer for controlling the illumination of an electroluminescent layer. Both layers are sandwiched between a pair of conductive layers which act as electrodes for applying a field across the semiconductor and electroluminescent layers. In this manner the exciting voltage is applied across both layers, and the emission of light is controlled by varying the resistance of the amorphous semiconductor material which produces a change in the way the exciting voltage is divided between the two layers.

The present invention employs a different electrode structure which results in a different form of excitation. One electrode structure suitable for use in accordance with the present invention is known as the interdigital-electrode. Such an electrode is shown on page 335 of the text "Photoelectronic Materials and Devices" edited by Simon Larach, published by D. Van Nostrand Company in 1965. In this publication an electroluminescent layer is applied over the interdigital-electrodes and a photoconductive layer is applied over the top of the electroluminescent layer. The photoconductive layer changes its resistance when light is applied thereto. After removal of the incident light, the photoconductor undergoes a characteristic decay resulting in fading of emission of light from the electroluminescent layer. Additionally, if the photoconductor is responsive to the frequency of the light emitted from the electroluminescent layer the photoconductor can lock onto the conducting state so that the information cannot be erased or modified.

This invention utilizes an amorphous semiconductor material such as chalcogenide glass or other compositions disclosed in U.S. Pat. No. 3,271,591 entitled "Symmetrical Current Controlling Device" by Stanford R. Ovshinsky issued on Sept. 6, 1966, or disclosed in U.S. Pat. application Ser. No. 63,404 filed on Aug. 13, 1970 by Stanford R. Ovshinsky which was abandoned in view of continuation-in-part application Ser. No. 161,219, filed July 9, 1971. These amorphous semiconductor materials undergo a change in structure in response to the application of energy including light, heat, photoflash lamp, voltage or various other forms of electromagnetic energy. The change in structure is accompanied by a change in resistance of the material as well as other changes in electrical, mechanical and optical properties. An electroluminescent layer or other form of optical display material is located in close proximity to the amorphous semiconductor layer and a number of electrodes are placed on the opposite side of the electroluminescent layer so that it is sandwiched between the electrodes and the amorphous semiconductor material. The electrodes may be shaped in the form of broad flat ribbons arranged in parallel rows and separated by a non-conductive gap. By applying a potential to two adjacent electrodes a field is established across the gap and through the layers of electroluminescent material and amorphous semiconductor material. The path of the field can be traced in serial fashion from one of the electrodes up through a portion of the electroluminescent material through the amorphous semiconductor material and over the top of the gap, and back down through the electroluminescent material. When the amorphous semiconductor material is in the low resistance state a larger portion of the potential drop appears across the electroluminescent layer than when the amorphous semiconductor material is in the high resistance state. Accordingly light is emitted from the electroluminescent layer adjacent to the low resistance amorphous semiconductor material. No light or a smaller amount of light is emitted from the electroluminescent material adjacent to amorphous semiconductor material which is in a higher resistance state. By selectively switching the structural condition of the amorphous semiconductor material various patterns of illumination can be produced in the electroluminescent material in accordance with the desired information to be displayed.

Since the amorphous semiconductor material undergoes a structural change as well as an electronic change as opposed to the case of a photoconductor which undergoes only an electronic change, displays embodying the present invention are non-volatile. Power can be removed entirely from the display after the amorphous semiconductor material is switched without losing the information pattern. Additionally, no excitation power is needed for the electroluminescent or other display material at the same time that the information pattern is applied to the amorphous semiconductor layer. Another advantage of the present invention is the accessible location of the amorphous semiconductor material which is not sandwiched between electrodes or covered by other encumbering layers, but is instead exposed at least on one side so that information bearing energy can be applied directly thereto. Still another advantage of the present invention is the ability to create a large variation in the potential across the electroluminescent layer with the use of only a relatively thin layer of amorphous semiconductor material. One of the other advantages accompanying the present invention when an electroluminescent layer is employed is the insensitivity of the amorphous semiconductor material to the light emitted by the electroluminescent layer thereby avoiding any lock-on of the amorphous semiconductor material into the low resistance state.

The amorphous semiconductor material is capable of being reversibly switched between the high resistance state and low resistance state. Accordingly, the information to be displayed can be modified in whole or in part by switching various portions of the amorphous semiconductor layer from one state to the other. Additionally, by switching the amorphous material into an intermediate state of resistance, gray scale illumination can be achieved. In accordance with still another feature of the present invention where the source of excitation is an alternating current power supply, variations in the contrast of the image displayed can be made by raising or lowering the frequency of the source, and variations in the intensity of the image displayed can be made by raising or lowering the amplitude of the alternating current. Variations in contrast can be made without requiring accompanying variations in the intensity and conversely, the intensity can be changed without changing the contrast.

Other advantages and features of this invention will be apparent to those skilled in the art upon reference to the accompanying specification, claims and drawings in which:

Figures 1, 2, 3, 4:
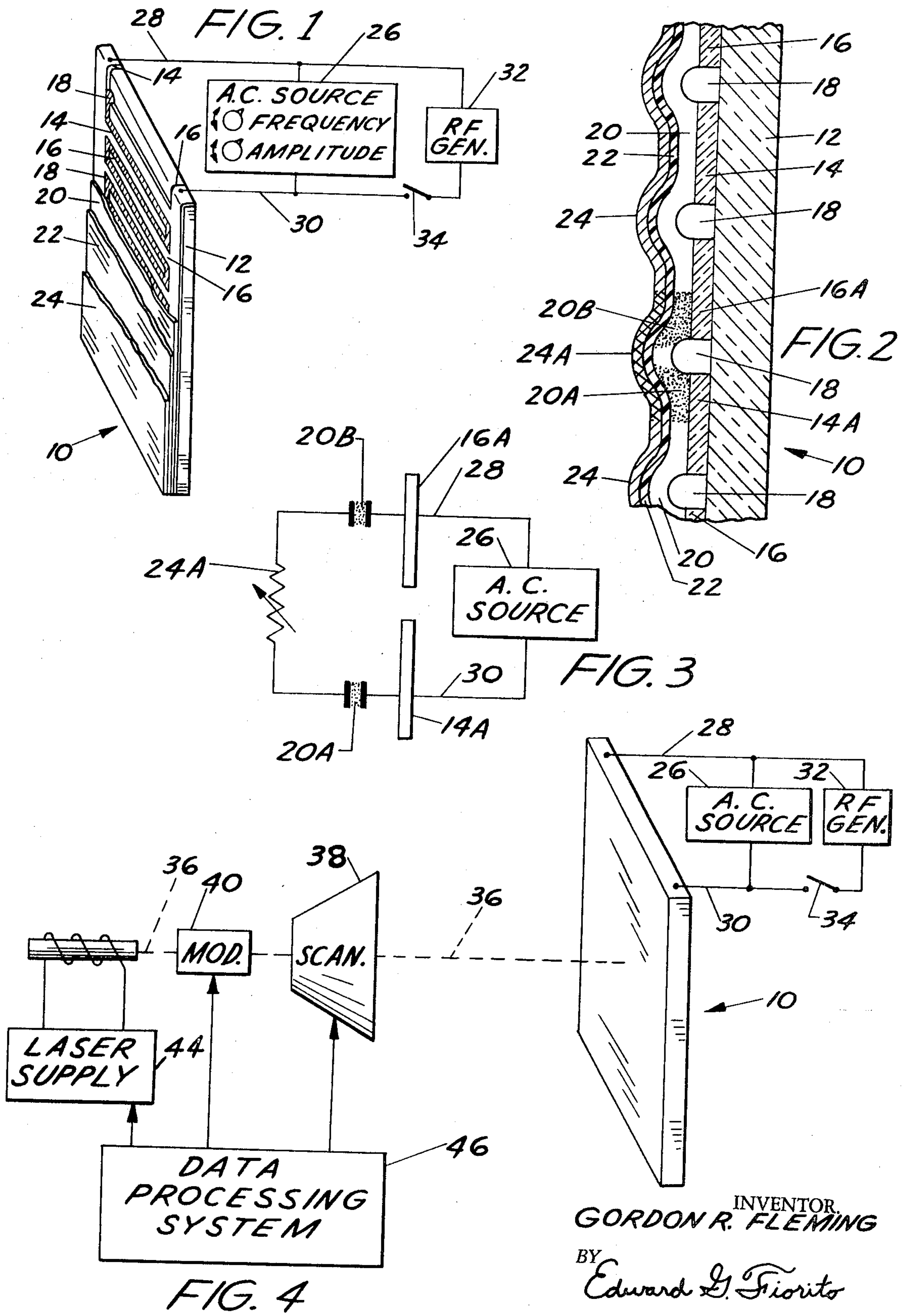
FIG. 1 is a schematic diagram illustrating a display panel embodying the present invention wherein interdigital-electrodes are employed.
FIG. 2 is an expanded view of a vertical cross-section of the panel illustrated in FIG. 1.
FIG. 3 is an electrical schematic of an equivalent circuit between two electrodes of the panel in FIGS. 1 and 2.
FIG. 4 is a schematic diagram illustrating a system embodying the present invention in which a laser is used to write and erase information on the panel illustrated in FIG. 1.
Figures 5, 6, 7, 8:
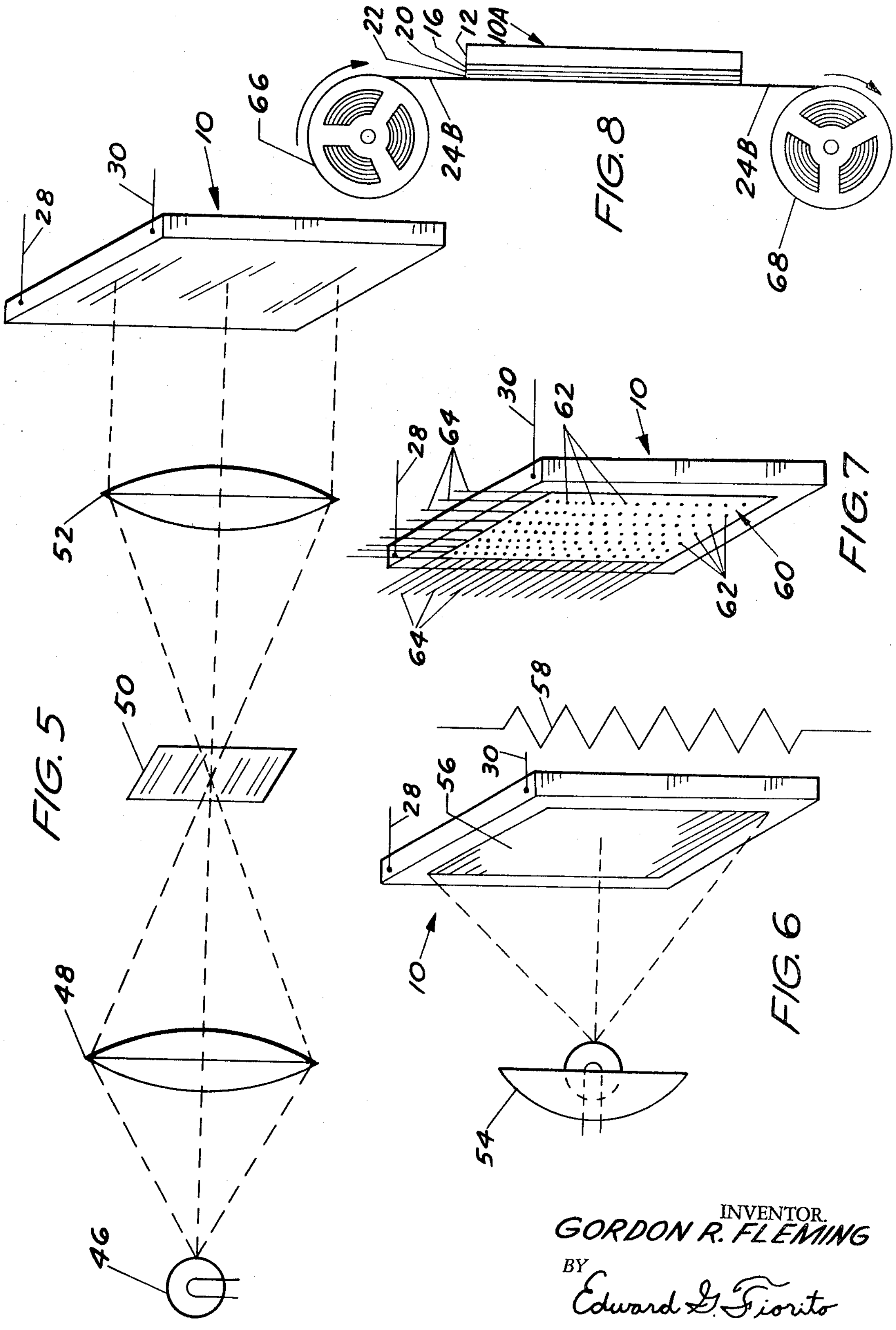
FIG. 5 is a schematic diagram illustrating a system embodying the present invention in which a light source is used to project an image onto the panel illustrated in FIG. 1.
FIG. 6 is a schematic diagram illustrating a system embodying the present invention in which photoflash lamp light is transmitted through a transparency onto the display panel illustrated in FIG. 1.

FIG. 7 is a schematic diagram illustrating a system embodying the present invention in which a matrix of light emitting diodes is formed on the display panel illustrated in FIG. 1; and FIG. 8 is a schematic diagram illustrating a system embodying the present invention wherein a portion of the panel illustrated in FIG. 1 is placed in close proximity to a movable flexible film of amorphous semiconductor material.

In FIG. 1 a display panel 10 is illustrated with a number of layers of material formed on the front surface of a glass substrate 12. A pair of interdigital-electrodes 14 and 16 are arranged in rows separated by a non-conductive gap filled with a dielectric material 18. A layer of electroluminescent material 20 is applied next, and an insulating layer 22 separates the electroluminescent layer 20 from an amorphous semiconductor layer 24.

FIG. 2 illustrates a vertical cross-section of the panel 10, and like numbers are applied to the same elements in FIGS. 1 and 2. The size of the various layers are greatly exaggerated in FIG. 2. Glass substrate 12 may be any suitable transparent oxide glass. The electrodes 14 and 16 are made of a transparent conductive material preferably tin oxide. However, other compositions can be used such as indium oxide ($In_2O_3$) or a thin transparent layer of gold (Au) as is known in the art. The dielectric material 18 can be composed of any high resistance material which can insulate electrode 14 from electrode 16. For example any of a variety of commercially available negative working photoresists can be used.

One preferred process of forming the panel 10 is to coat the glass substrate 12 with tin oxide ($SnO_{2-x}$:Sb) by spraying the glass heated to 400° to 700° C. with an aqueous or alcoholic solution of a tin salt such as $SnCl_4 \cdot 5\ H_2O$, usually containing about 1.5% $SbCl_3$. Glass coated in this manner is available as a commercial product. An opaque metal, such as molybdenum, is then vapor deposited or sputtered over the tin oxide layer. The molybdenum deposition is not shown in FIG. 2. Next a photoresist is applied over the molybdenum layer and exposed through an interdigitated pattern having transmissive regions corresponding to the electrodes 14 and 16. The unexposed regions of the photoresist are washed away and then an etchant is used to remove the molybdenum layer and the tin oxide layer leaving these layers in a pattern corresponding to electrodes 14 and 16. Next the remaining photoresist is removed and the entire surface is recoated with a new photoresist layer. Following this the panel 10 is illuminated from behind the glass substrate 12 resulting in exposure of the photoresist only in the gap between electrodes 14 and 16 since the molybdenum and gold layer is opaque and the light cannot reach the photoresist in these regions. The unexposed photoresist is then washed away leaving the photoresist in the gap between electrodes 14 and 16. The gold and molybdenum layer is then etched off the top of the tin oxide electrodes 14 and 16.

Having completed the fabrication of electrodes 14 and 16 and inserted the dielectric material 18, the electroluminescent material 20 is then applied. Zinc sulfide doped with copper and chlorine, or other electroluminescent phosphors which emit light when subjected to a field may be used. The phosphor may be imbedded in a plastic binder and sprayed over the top of electrodes 14 and 16 and dielectric material 18, or the phosphor may be imbedded in a glass frit or deposited by vacuum evaporation techniques.

The insulating layer 22 may be composed of any high resistance dielectric material such as powdered barium titanate ($BaTiO_3$) in a plastic coating which may be deposited on the electroluminescent material 20. Layer 22 serves to provide electrical insulation between the electroluminescent layer 20 and the amorphous semiconductor layer 24. Layer 22 is optional for use in the present invention depending upon whether or not additional insulation is required between layers 20 and 24. While dielectric material 18 can also be eliminated, it has been found that in high resolution panels with tightly compact electrodes the edges of electrodes 14 and 16 produce high fields which can cause spurious light emissions unless some insulation is provided.

Amorphous semiconductor layer 24 can be composed of a variety of different compositions which have become generally known in the art, including chalcogenide glasses and a variety of materials disclosed in U.S. Pat. No. 3,271,591, entitled "Symmetrical Current Controlling Device" issued Sept. 6, 1966, by Stanford R. Ovshinsky. Other materials, catalysts and techniques for enhancing and controlling the switching of amorphous semiconductor materials are found in co-pending U.S. Pat. application Ser. No. 63,404 filed on Aug. 13, 1970, by Stanford R. Ovshinsky which was abandoned in view of continuation-in-part application Ser. No. 161,219, filed July 9, 1971. Some preferred materials found to be suitable for use in the present invention are compositions of about 85 percent tellurium 15 percent germanium with additions of about 2 percent sulfur and 2 percent of one of the group phosphorus, antimony, arsenic or bismuth. Other materials are based on a composition of 70 percent tellurium 30 percent thallium and compositions from the ternary system cadmium, germanium and arsenic. The amorphous semiconductor material 24 may be deposited by sputtering or vacuum evaporation, use of the latter deposition technique depending upon the amount of heat which the remaining elements in panel 10 can withstand.

Amorphous semiconductor materials 24, such as those identified above, exhibit the ability to be structurally altered between different stable states. In one state the atomic structure condition is substantially disordered and generally amorphous having a certain local order or localized bonding, and in another state the atomic structure condition has another local order or localized bonding usually tending toward a more ordered crystalline-like condition. The amorphous semiconductor material 24 exhibits different characteristics in each of these states. Changes in resistance are of particular interest in connection with the operation of the present invention. In the disordered or generally amorphous state the resistance of material 24 is higher than in the more ordered or crystalline-like state. The amorphous material 24 can be switched between states by applying energy in a variety of ways which will be discussed in more detail below.

Referring to FIG. 1, a source of alternating current 26 is shown connected by a pair of leads 28 and 30 to electrodes 14 and 16 respectively. AC source 26 may provide a sinusoidally varying signal or more complex waveform having different wave shapes such as square waves, sawtooth waves and the like. There may also be a DC bias complement or a very high frequency carrier superimposed on a fundamental alternating current waveform.

In FIG. 2 a region 24A of the amorphous semiconductor layer 24 is illustrated. This region 24A is shown to be in the low resistance state, while the remaining portion of amorphous semiconductor layer 24 is in the high resistance state. The electrodes 14 and 16 adjacent to region 24A are designated 14A and 16A in FIG. 2. When AC source 26 applies a potential to electrodes 14 and 16, a field is set up between electrodes 14A and 16A in FIG. 2. The path of this field may be traced from electrode 14A to electrode 16A as follows. Assuming an initial starting point on the surface of electrode 14A, the field passes through electroluminescent material 20 arriving at amorphous semiconductor material 24 in region 24A. Some potential drop occurs across the amorphous material in region 24A and the remainder of the field is applied to the portion of electroluminescent material 20 located adjacent to electrode 16A. The portions of electroluminescent material 20 which are excited by this field are emphasized by a cluster of dots and designated 20A and 20B in FIG. 2.

Referring to FIG. 3 an electrical equivalent circuit of the electrodes 14A and 16A, electroluminescent regions 20A and 20B, and amorphous semiconductor region 24A is illustrated. Capacitors are used to designate the equivalent electrical operation of electroluminescent layer regions 20A and 20B. A variable resistor is used to designate the electrical equivalent of amorphous semiconductor layer in region 24A. When AC source 26 applies an alternating current potential to electrodes 14A and 16A the field is divided between elements 20A, 24A and 20B. It can be seen that when the resistance of the amorphous semiconductor region 24A is reduced, a greater portion of the potential from AC source 26 is applied across electroluminescent regions 20A and 20B. Accordingly these regions 20A and 20B are excited into emitting light of a given intensity. As the resistance of amorphous semiconductor region 24A is increased the potential drop across electroluminescent regions 20A and 20B decreases and a similar reduction or elimination of the light emitted from these regions 20A and 20B is observed.

In operation the desired pattern of information is applied to the front of panel 10 by the introduction of energy into amorphous semiconductor layer 24 in a variety of ways to be discussed below. This energy switches selected regions of amorphous semiconductor layer 24 from the high resistance state to the low resistance state. When AC source 26 applies power to electrodes 14 and 16 electroluminescent layer 20 emits light in those regions where amorphous semiconductor material 24 is in the low resistance state. The light emitted from electroluminescent layer 20 appears on the backside of panel 10 and may be viewed through glass substrate 12.

When it is desired to change the pattern of information displayed on panel 10, an RF generator 32 is connected into electrodes 14 and 16 via lines 28 and 30 by closing a switch 34. The RF generator 32 supplies a radio-frequency signal, typically about 450 kilohertz. Because of the interdigital structure of electrodes 14 and 16 the entire panel 10 is immersed in radio-frequency waves which set up currents in those layers capable of conducting current. Regions of amorphous layer 24, such as region 24A, conduct a higher degree of current than other portions of layer 24 which are in the high resistance state. Accordingly heat is developed in these low resistance regions of amorphous semiconductor layer 24 causing these regions to return to the disordered or generally amorphous condition after switch 34 is opened. It is preferable to have the amorphous semiconductor layer 24 in contact with a good heat sink since it must be quenched rapidly after heating. It may be necessary in some applications of the present invention to add additional layers of material such as $Al_2O_3$, Be O, etc., either on top of or underneath the amorphous semiconductor 24.

AC source 26 is provided with a means for varying the frequency and amplitude of the alternating current. It has been found that in accordance with the present invention, if the frequency of AC source 26 is lowered the electroluminescent layer 20 can be made to emit some degree of light even in regions where amorphous semiconductor layer 24 is in the high resistance state. One explanation of this result depends upon the time constant, or RC factor, of the equivalent electrical circuit as shown in FIG. 3 for each region of amorphous semiconductor layer 24. Since the time constant is related to the resistance and capacitance of the equivalent circuit shown in FIG. 3, and since the capacitance remains relatively constant, the time constant varies with changes in resistance. A longer time constant results in a circuit which is not as responsive to high frequencies as a shorter time constant circuit. Accordingly a high frequency of oscillation of source 26 is capable of coupling energy through the equivalent circuit of FIG. 3 only if the resistance of the amorphous semiconductor region 24A is sufficiently small. Therefore it has been found that the contrast between the image area and the background area of panel 10 can be varied by changing the frequency of AC source 26. Specifically, when the frequency of AC source 26 is raised slightly the background area becomes darker and the image area does not exhibit any appreciable change in intensity. On the other hand if the frequency of AC source 26 is lowered the background region begins to increase its illumination while the image area does not change its intensity in any appreciable way. When varying the contrast by changing frequency of AC source 26 it is not necessary to change the overall intensity of the image by increasing the amplitude of the alternating current. However, AC source 26 is provided with an amplitude control which varies the amplitude of the alternating current and accordingly the amount of power supplied to panel 10. This causes a corresponding variation in the overall intensity of the image displayed on panel 10. For example, by increasing the amplitude the intensity of both the image area and the background area can be raised. A decrease in amplitude lowers the amount of illumination from the background and image area. If the background is not providing any illumination, a decrease in the amplitude will only reduce the intensity of the image area.

FIGS. 4–7 illustrate the various ways in which energy can be applied to panel 10 in order to display information. Like numbers are used in FIGS. 4–7 to designate the same items shown in FIGS. 1–4. Referring to FIG. 4 a laser beam 36 impinges on panel 10 causing the amorphous semiconductor layer 24 contained therein (but not shown in FIG. 4) to switch from the high resistance state to the low resistance state. Laser beam 36 is positioned by a scanner 38 and modulated in intensity by a modulator 40. The laser beam 30 originates from a laser source 42 provided with power from a laser supply 44. Elements 38, 40 and 44 are operated under control of signals from a data processing system 46. The operation of the laser beam control portion of the system shown in FIG. 4 is well-known in the art. However, further details are disclosed in co-pending U.S. Pat. application Ser. No. 17,641 entitled "Information Storage Systems Utilizing Amorphous Thin Films" filed Mar. 9, 1970, by Julius Feinleib. Scanner 68 may produce a raster scan pattern on panel 10 or a curve line pattern, or some other form of pattern on panel 10. When AC source 26 supplies power to panel 10 the desired pattern is displayed on the backside thereof. Erasure of the image can be accomplished by closing switch 34 and coupling RF generator 32 into panel 10 as described above in connection with FIG. 1. Alternatively, the intensity of laser beam 36 can be varied by modulator 40, and scanner 38 can cause beam 36 to retrace over its previous path so that the amorphous semiconductor material in panel 10 is switched back to its high resistance state. This operation is also described in more detail in the aforementioned U.S. Pat. application Ser. No. 17, 641.

Referring to FIG. 5 another system is illustrated for applying energy to panel 10. In this system a light source 46, such as a tungsten lamp, emits light which is collected by a lens 48 and projected through a transparency 50 onto another lens 52 which directs the pattern of light onto panel 10 so that opaque areas on transparency 50 result in corresponding dark areas on panel 10. In this manner the entire image to be displayed can be recorded on panel 10 simultaneously and in parallel, instead of composing the image sequentially over a period of time by a series of lines or spots as illustrated in the system of FIG. 4.

Another system for recording the entire pattern of information at one time is illustrated in FIG. 6. A photoflash lamp 54 may be a Xenon or quartz iodine flash lamp, or a conventional flashbulb. The light impinges on a transparency 56 which is placed in contact with the front side of panel 10. The light which passes through transparency 56 causes the amorphous semiconductor material 24 in panel 10 to switch to the low resistance state. Using this method of applying energy to panel 10, it has been found that when the AC signal source 26 is applied via leads 28 and 30 at a power level of 100 volts RMS and a frequency of 4 kilohertz a bright finely detailed striated image appears against a dark background. By varying the frequency range from 400 hertz to 10 kilohertz the image remained bright but contrast decreased as the frequency was lowered since the background began emitting some light. The thickness of the amorphous semiconductor layer 24 for this operation may be about 1 micron and composed of an 85 percent tellurium 15 percent germanium composition with the additions of 2 percent sulfur and 2 percent of one of the group phosphorus, antimony, arsenic or bismuth.

The image appearing on panel 10 in FIG. 6 can be inverted by removing transparency 56 and re-energizing photoflash lamp 54. In this system a type 25B blue coated flashbulb is used in photoflash lamp 54. The photoflash lamp may be activated with a 12.5 volt DC supply. After the first exposure through the transparency 56, a new flashbulb is inserted in photoflash lamp 54 and the transparency 56 is removed. After the second flash those regions in the high resistance state are switched to the low resistance state and the regions in the low resistance state are switched to the high resistance state causing the image emitted from the electroluminescent layer 20 within panel 10 to be the inverse from the image displayed after the first flash from lamp 54.

Still another method of operating the system illustrated in FIG. 6 begins with the amorphous semiconductor material 24 contained in panel 10 initially in the low resistance or more ordered crystalline like condition. By applying a large enough source of energy from photoflash lamp 54 the amorphous semiconductor layer 24 in panel 10 can be selectively heated to an amorphous condition and quickly quenched by an appropriate heat sink after the burst of light from photoflash lamp 54 terminates. In this mode of operation a negative of the image appearing on transparency 56 is displayed by panel 10. The amorphous semiconductor 24 contained in panel 10 can be returned to the low resistance condition by heat irradiating from a heating element 58. By slowly cooling the heating element 58 the amorphous semiconductor material 24 in panel 10 cools to a more ordered crystalline like phase.

Referring to FIG. 7, panel 10 is illustrated with a matrix 60 of light emitting diodes 62 formed thereon. The light emitting diodes may be of the gallium arsenide type which can be addressed by signals supplied by an array of X and Y conductors 64. The diodes 62 produce light which switches the amorphous semiconductor material contained in panel 10. The amorphous semiconductor 24 can be switched back by changing the intensity of the light emitted by diode 62 in response to variations in the energy on X and Y conductors 64. Other forms of bulk reset can be utilized such as heating element 58 in FIG. 6, or RF generator 32 in FIG. 1. One advantage of the system of FIG. 7 is the ability to make the entire system using thin film batch fabrication techniques.

FIG. 8 illustrates another system embodying the present invention wherein the amorphous semiconductor layer 24 is formed into a flexible movable film designated 24B. The film 24B can be made by vapor depositing amorphous semiconductor material on a Mylar substrate. A pair of reels 66 and 68 cause the amorphous semiconductor film 24B to pass by a panel 10A composed of all of the elements and layers in the display panel 10 illustrated in FIGS. 1 and 2, except for the amorphous semiconductor layer 24. In the system of FIG. 8 the amorphous semiconductor film 24B is moved past the panel 10A causing the electroluminescent layer 20 to emit light in accordance with the pattern of low resistance regions on film 24B when excited by an AC source such as source 26. The reels 66 and 68 can be stopped for stationary display, or continuously moved in synchronism with a pulsed source of excitation voltage to produce a motion picture display.

The present invention can be embodied in various other systems besides those shown in FIGS. 4–8. Instead of a laser beam 36 amorphous semiconductor material 24 can be switched using an electron beam. It may be necessary in such a system to include panel 10 in a vacuum system, for example as the face of a cathode ray tube. Other applications of the present invention include systems in which the amorphous semiconductor material 24 is coupled to the electroluminescent layer 20 in a temporary manner such as through a gaseous or fluid medium, a vacuum, or meltable or removable solid which would allow the amorphous semiconductor layer 24 and the electroluminescent material 20 to be separated. Additionally, a plurality of electron beams or laser beams can be used to write on the amorphous semiconductor material 24 simultaneously and the image can be displayed at the same time or at any time in the future. Such beamed energy systems allow the image to be partially erased or totally erased.

Instead of an electroluminescent material 20, a liquid crystal, electrochromic material, or gas discharge medium can be used. Any optical display material which emits light, changes its ability to reflect or transmit light, or alters any other optical property in response to an electric field applied thereacross can be employed in accordance with the broad aspects of the present invention.

While in some applications it may be advantageous to leave the amorphous semiconductor material 24 exposed for ready accessing, some applications may require a transparent overcoating to protect the amorphous semiconductor layer 24. If the overcoating is also made conductive and insulated from the amorphous semiconductor layer 24, it would provide another control electrode for varying the light emission from the electroluminescent layer 20.

Other sources of potential can be used instead of AC source 26 where the electroluminescent material is responsive to a DC potential. An example of a DC responsive electroluminescent material is a zinc sulfide powder doped with about 2 percent manganese, arranged so that the particles contact one another as well as both electrodes. In this application resistive coupling exists between electrodes 14 and 16 rather than a capacitive coupling as shown in the equivalent circuit diagram in FIG. 3.

The schematic diagrams in FIG. 1 and FIG. 2 are greatly exaggerated in order to illustrate the various layers and elements. For a fine high resolution panel conductors 14 and 16 can be made very small and the gaps filled with dielectric material 18 can be made relatively smaller. Similarly the thickness of the layers, particularly as shown in FIG. 2 is exaggerated and could be made extremely thin using vacuum evaporation and sputtering techniques for depositing the thin films.

Color can be displayed by using a multicolor phosphor as the electroluminescent layer 20. By selectively illuminating certain portions of this layer a colored image can be displayed.

While the amorphous layer 24 is illustrated in FIG. 2 to be about half as thick as the electroluminescent layer 20, the amorphous layer 24 can be considerably thinner in the order of 10 percent or less of the thickness of the electroluminescent layer 20. Since the excitation current induced by AC source 12 travels along the length of the amorphous semiconductor layer 24 rather than across the thickness of the layer 24, it is not necessary to have the thickness of amorphous layer 24 in the same order of magnitude as the thickness of the electroluminescent layer 20.

Numerous other modifications may be made to various forms of the invention described herein without departing from the spirit and scope of the invention.

What is claimed is:

1. Apparatus for displaying information comprising:

a layer of amorphous semiconductor material capable of having portions thereof switched between at least a high resistance state and a low resistance state in response to the application of a pattern of energy corresponding to the information to be displayed;

a layer of optical display material placed in close proximity to said semiconductor material and capable of changing its optical properties to produce an image in response to the application of an electrical potential thereacross;

a plurality of electrical conductors placed in close proximity to said layer of optical display material so that at least a portion of said optical display material is located between said amorphous material and at least two of said electrical conductors; and coupling means for applying an electrical voltage to said at least two conductors in sufficient quantity to establish a potential between said at least two conductors which potential is applied across the series combination of a portion of said display material, a portion of said amorphous material and another portion of said display material so that when said amorphous material is in said low resistance state the optical properties of those portions of said display material which have said potential applied thereacross are changed to produce an image corresponding to the information to be displayed.

2. Apparatus as defined in claim 1 wherein said amorphous semiconductor material is capable of having portions thereof reversibly switched between said high resistance state and low resistance state so that the information to be displayed can be modified.

3. Apparatus as defined in claim 1 further characterized by the addition of input means for selectively applying said energy to certain portions of said amorphous semiconductor material in accordance with a pattern of information to be displayed.

4. Apparatus as defined in claim 3 wherein said energy is a laser beam.

5. Apparatus as defined in claim 3 wherein said energy is an electron beam.

6. Apparatus as defined in claim 3 wherein said energy is in the form of photoflash lamp light.

7. Apparatus as defined in claim 1 wherein said electrical conductors are constructed in the shape of flat ribbons of conductive material arranged in parallel rows separated by a nonconductive gap between rows.

8. Apparatus as defined in claim 7 wherein alternate ribbons of said conductive material are connected in common forming at least two separate electrical networks.

9. Apparatus as defined in claim 8 further characterized by the addition of a source of alternating current connected to said coupling means.

10. Apparatus as defined in claim 9 wherein said non-conductive gap between each row of conductive material is filled with a dielectric material to inhibit the establishment of a high potential at the edges of said conductive material.

11. Apparatus as defined in claim 7 wherein said optical display material is an electroluminescent material which emits light in response to the application of an electric field thereacross.

12. Apparatus as defined in claim 11 further characterized by the addition of a source of alternating current having a pair of terminals one connected through said coupling means to one of said networks and the other connected through said coupling means to the other of said networks.

13. Apparatus as defined in claim 12 wherein said source of alternating current includes means for varying the amplitude of said alternating current to change the intensity of light emitted from said electroluminescent material.

14. Apparatus as defined in claim 12 wherein said source of alternating current includes means for varying the frequency of said alternating current to change the contrast between the light emitted from different portions of said electroluminescent material.

15. Apparatus as defined in claim 9 further characterized by the addition of a source of radio-frequency alternating current having a pair of terminals one connected through said coupling means to one of said networks and the other connected through said coupling means to the other of said networks, and having sufficient energy to switch those portions of said amorphous semiconductor material which are in said low resistance state into said high resistance state so that the information to be displayed can be modified.

16. Apparatus as defined in claim 1 further characterized by the addition of a matrix of light emitting elements including means for energizing selected elements in said matrix and located in close proximity to said amorphous semiconductor material for generating said pattern of energy corresponding 21 to the information to be displayed.

17. Apparatus as defined in claim 1 further characterized by the addition of feed means for moving the position of said layer of amorphous semiconductor material with respect to the position of said layer of optical display material so that different information is displayed.

* * * * *